Nov. 23, 1971   J. L. OLYNICK   3,621,590
CHILD'S EDUCATIONAL TOY
Filed Aug. 10, 1970
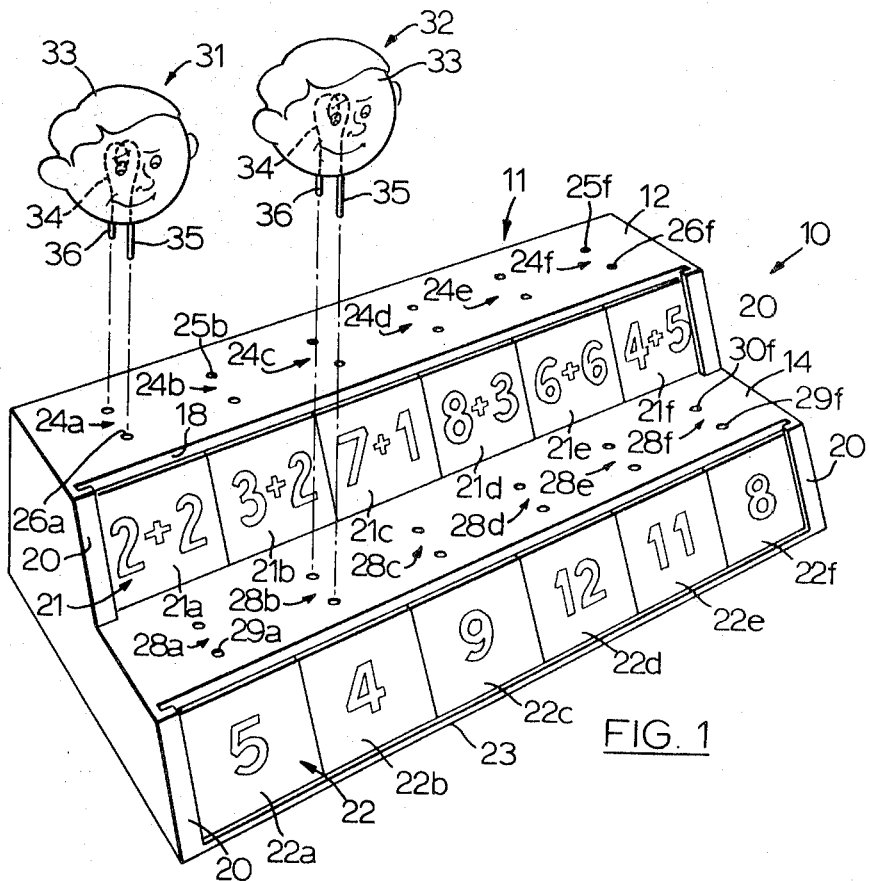
INVENTOR.
J. L. OLYNICK
BY
Agent

United States Patent Office 3,621,590
Patented Nov. 23, 1971

3,621,590
CHILD'S EDUCATIONAL TOY
Joseph Louie Olynick, St. Catherines, Ontario, Canada, assignor to Edmund Ma, Toronto, Ontario, Canada
Filed Aug. 10, 1970, Ser. No. 62,274
Int. Cl. G09b 7/10
U.S. Cl. 35—9 C                                                6 Claims

ABSTRACT OF THE DISCLOSURE

An educational toy is provided with two sets of double-pole electrical sockets. An electrically operable indicator or lamp can be selectively inserted into each socket. Panels having a number of indicia-bearing frames or units are inserted into guideways provided for such purpose on the housing of the toy so that each such frame of one panel is disposed in apposition to a respective one of the sockets of one set and each such frame of the other panel is similarly disposed in apposition to a respective one of the sockets of the other set. The terminals of the various sockets are electrically interconnected within the housing to an electric storage cell so that both lamps are illuminated when they are inserted into sockets which are in apposition to panel frames bearing indicia having a predetermined relationship.

BACKGROUND OF THE INVENTION

The present invention relates to educational toys and more particularly to an educational toy constructed so as to provide a double electrically initiated signal or indication when two electrically operable indicating means are disposed in particular predetermined relative positions on the casing or housing of the toy.

Many educational toys involving the insertion of electrical connectors into electrical sockets have previously been proposed but many of these toys have been relatively complex and, therefore, expensive in their construction or have been somewhat indefinite or unsatisfying in the response which they provide to maintain a child's interest.

It is accordingly a principal object of this invention to provide an educational toy of particularly simple construction and which lends itself, therefore, to modern mass production techniques with its housing usefully formed of a moulded plastics material.

Yet another object of this invention is to provide an educational toy in which two indicating means such as electrically operable lamps are energized when disposed in predetermined correct relative positions.

A further object of this invention is to provide an educational toy of the aforesaid type and which can be manufactured so as to have considerable appeal to young children and consequently to have considerable value in the education of such young children, for example, in helping them to acquire basic skills in such subjects as arithmetic, association, alphabet, reading, shape and colour preception, etc.

Another object of this invention is to provide an educational toy in which indication of the correct positioning by the use of two movable members is provided by actuation, for example, illumination, of both said movable members per se.

Other objects of the invention will become apparent as the description herein proceeds.

SUMMARY OF THE INVENTION

In its broadest scope, the present invention provides an educational toy comprising a housing including two panels each having a plurality of indicia-carrying frames; first and second sets of double-pole electrical connectors, each said double-pole electrical connector being disposed in apposition to a respective one of the frames of said panels; first electrical connection means electrically connected within said housing to a first electrical terminal of each and every one of said first set of said double-pole electrical connectors; second electrical connection means electrically connected within said housing to a first electrical terminal of each and every one of said second set of said double-pole electrical connectors; a plurality of third electrical connection means each of which is electrically connected within said housing between a second electrical terminal of an individual one of said first set of said double-pole electrical connectors and a second electrical terminal of an individual one of said second set of said double-pole electrical connectors; and two electrically operable indicating means each adapted detachably to be connected electrically between said first and second electrical terminals of any respective ones of said first and second sets of said double-pole electrical connectors, whereby said two electrically operable indicating means are simultaneously operated when an electrical energy source is connected between said first and second electrical connection means and when, simultaneously, said two indicating means are connected between said first and second electrical terminals of any pair of said double-pole electrical connectors of said first and second sets thereof which are electrically interconnected within said housing by any one of said third electrical connection means thereby to indicate a predetermined visual relationship between the indicia-carrying frames disposed in apposition to sad double-pole electrical connectors to which said indicating means are connected.

In accordance with a particularly useful feature of this invention, the aforementioned panels are removably supported on the housing of the toy to permit of several interchangeable panels for use therewith.

In accordance with another useful feature of this invention, each of the indicating means provided comprises a light-transmitting body, manufactured, for example, to resemble a comic human face and head and housing an electrical filament bulb operatively connected to prongs carried by the body of the indicating means. Such a pronged body can then be inserted into any one of a respective set of double-pole electrical sockets provided on the housing of the toy in apposition to respective indicia-bearing frames of a panel formed in or removably supported on the housing of the toy.

Other features and advantages of the invention will become apparent as the description herein proceeds.

BRIEF DESCRIPTION OF THE DRAWINGS

The invention will now be described merely by way of illustration with reference to the accompanying drawings in which:

FIG. 1 is a perspective view of one embodiment of an educational toy in accordance with the invention and showing two indicating means of that toy in exploded dispositions; and FIG. 2 is an electrical circuit diagram showing the electrical interconnections provided within the housing of the toy shown in FIG. 1.

DESCRIPTION OF THE PREFERRED EMBODIMENT

The educational toy generally indicated at 10 in FIG. 1 of the accompanying drawings comprises an externally terraced housing generally indicated at 11 and including an upper generally horizontal elongated ledge 12 and a lower generally horizontal elongated ledge 14. The lower ledge 14 is integrally formed along its forward edge with a forwardly and downwardly sloping face 16 and, along its rearward edge, with an upwardly and rearwardly sloping upper face 18.

Each of the faces 16 and 18 is provided along each of its side edges with a panel-guiding flange member 20 to permit panels, such as panels generally indicated at 21 and 22 and bearing indicia-carrying frames or units indicated at 21a to 21f and 22a to 22f respectively to be supported in the positions illustrated on the housing 11. A forwardly extending flange 23 is provided along the lower edge of the face 16 to support the lower edge of the panel 22.

Along the upper ledge 12, there are provided six double-pole electrical sockets generally indicated by the legends 24a to 24f and each of which includes a first electrical terminal indicated by the legends 25a to 25f and a second electrical terminal indicated by the legends 26a to 26f (FIG. 2). Similarly, six double-pole electrical sockets 28a to 28f are provided along the lower ledge 14 and these sockets include first terminals 29a to 29f and second terminals 30a to 30f.

The educational toy 10 also comprises two electrically operable indicating means 31 and 32, each of which, in the particular embodiment 10 illustrated in the accompanying drawings, comprises a light-transmitting body 33 resembling a comic human head and housing an electrical filament bulb 34, the electrical leads of which are connected to electrical connection prongs 35 and 36. The prongs 35 and 36 are removably insertable into any of the aforementioned double-pole sockets 24a to 24f and 28a to 28f respectively for electrical interconnection in a manner yet to be described.

The invention is not of course restricted to forming the indicating means 31 and 32 so that they resemble human heads, other configurations being equally possible without departing from the scope of the invention.

It is to be noted at this juncture that, when the indicating means 31 is inserted into any one of the sockets 24a to 24f, it is then disposed in apposition or alignment with a respective one of the indicia-bearing frames or units 21a to 21f of the panel 21 supported in the panel-guiding flange members 20 of the upper face 18. Similarly, when the indicating means 32 is inserted into any one of the sockets 28a to 28f, it is disposed in apposition or alignment with a respective one of the indicia-bearing frames or units 22a to 22f of the panel 22 supported in front of the lower face 16.

Referring now in greater detail to FIG. 2 of the accompanying drawings, it will be seen therefrom that the toy 10 comprises a first electrical connection means or wire 40 which is connected to each and every one of the first terminals 25a to 25f of the upper set of sockets 24a to 24f. Similarly, a second electrical connection means or wire 41 is connected to each and every one of the first terminals 29a to 29f of the lower set of sockets 28a to 28f.

It will also be seen from FIG. 2 that the wires 40 and 41 are shown therein as being connected to the terminals of a storage battery or cell 42 but it will also be understood that other sources of electrical energy could be used equally effectively in the toys of this invention.

Referring further to FIG. 2 of the accompanying drawings, it will be noted therefrom that the toy 10 also comprises a plurality of third electrical connection means or wires 43a to 43f which are each connected between an individual one of the second terminals 26a to 26f of the sockets 24a to 24f of the upper set and an individual one of the second terminals 30a to 30f of the sockets 28a to 28f of the lower set. It is considered to be unnecessary to identify herein each particular interconnection provided by these wires 43a to 43f since such interconnections will readily be understood by reference to FIG. 2. It should, perhaps, however, be explained that the interconnections provided by the wires 43a to 43f are such that they correspond to a predetermined relationship or association between the indicia carried by the frames or units of the panel 21 disposed in front of the upper face 18 and the indicia carried by the frames or units of the panel 22 disposed in front of the lower face 16. In the particular toy 10 shown in the accompanying drawings, the upper panel 21 is shown as having printed thereon arithmetical "Questions" in the form of simple additions while the lower panel 22 has the corresponding "Answers" printed thereon, the electrical connections provided by the wires 43a to 43f being such as to energize both of the filament bulbs 34 in the indicating means 31 and 32 when the latter are inserted in apposition to both a given "Question" frame and the corresponding "Answer" frame.

Although the invention has been illustrated for the provision of a "Question" and "Answer" type relationship between the indicia carried by the panels 21 and 22 respectively, it will be understood that other useful relationships may be provided between the indicia on the two panels.

Other variations within the scope of the invention are also possible. For example, the indicating means 31 and 32 need not be formed, as already indicated, to represent human heads. The use of sound-producing devices instead of visual indicating means is also possible.

Furthermore, it is equally within the scope of this invention to provide more or less than six units or frames for each panel and even to provide more than two panels for each toy. In the latter case, the housing 11 would of course need to be modified to provide the required additional sets of sockets and panel holders. The invention equally embraces educational toys as hereinbefore generically defined and in which the indicia-carrying panels are permanently affixed to the housing of such a toy.

What I claim is new and desire to protect by Letters Patent of the United States is:

1. An educational toy comprising a housing including two panels each having a plurality of indicia-carrying frames; first and second sets of double-pole electrical connectors, each said double-pole electrical connector being disposed in apposition to a respective one of the frames of said panels; first electrical connection means electrically connected within said housing to a first electrical terminal of each and every one of said first set of said double-pole electrical connectors; second electrical connection means electrically connected within said housing to a first eletrical terminal of each and every one of said second set of said double-pole electrical connectors; a plurality of third electrical connection means each of which is electrically connected within said housing between a second electrical terminal of an individual one of said first set of said double-pole electrical connectors and a second electrical terminal of an individual one of said second set of said double-pole electrical connectors; and two electrically operable indicating means each adapted detachably to be connected electrically between said first and second electrical terminals of any respective ones of said first and second sets of said double-pole electrical connectors, whereby said two electrically operable indicating means are simultaneously operated when an electrical energy source is connected between said first and second electrical connection means and when, simultaneously said two indicating means are connected between said first and second electrical terminals of any pair of said double-pole electrical connectors of said first and second sets thereof which are electrically interconnected within said housing by any one of said third electrical connection means thereby to indicate a predetermined visual relationship between the indicia-carrying frames disposed in apposition to said double-pole electrical connectors to which said indicating means are connected.

2. An educational toy as claimed in claim 1 in which said panels are removably supported on said housing in respective panel holders provided thereon.

3. An educational toy as claimed in claim 1 in which each said double-pole electrical connector comprises a double-pole electrical socket and in which each said indicating means includes a double-prong electrical plug for removable insertion into said sockets.

4. An educational toy as claimed in claim 1 in which said housing has an external terraced configuration including two generally horizontal elongated surfaces and two upstanding elongated surfaces, said panels being provided on said upstanding elongated surfaces and said first and second sets of double-pole electrical connectors being provided in said generally horizontal elongated surfaces so as to be disposed in apposition to the respective ones of the frames of said panels.

5. An educational toy as claimed in claim 4 in which said electrical connectors of said first set thereof are aligned with said electrical connectors of said second set thereof and in which each said third electrical connection means extends from said second electrical terminal of one of said electrical connectors of said first set thereof to said second electrical terminal of an offset one of said electrical connectors of said second set thereof.

6. An educational toy as claimed in claim 3 in which each said electrically operable indicating means comprises a light-transmitting body carrying said double-prong electrical plug and housing an electrical filament operatively connected to the prongs of said plug.

References Cited
UNITED STATES PATENTS

| | | | |
|---|---|---|---|
| 2,104,718 | 1/1938 | Dougherty | 35—9 R C |
| 2,424,169 | 7/1947 | Hoffman | 35—35 H |
| 2,724,910 | 11/1955 | Kelly | 35—9 R C |
| 3,070,904 | 1/1963 | Saba | 35—9 R C |

WILLIAM H. GRIEB, Primary Examiner